United States Patent
Kondo et al.

(10) Patent No.: US 12,237,680 B2
(45) Date of Patent: Feb. 25, 2025

(54) POWER CONVERSION DEVICE

(71) Applicant: TMEIC Corporation, Chuo-ku (JP)

(72) Inventors: Kenichi Kondo, Chuo-ku (JP); Naoki Morishima, Chuo-ku (JP)

(73) Assignee: TMEIC Corporation, Chuo-ku (JP)

( * ) Notice: Subject to any disclaimer, the term of this patent is extended or adjusted under 35 U.S.C. 154(b) by 0 days.

(21) Appl. No.: 18/041,117

(22) PCT Filed: Jun. 29, 2021

(86) PCT No.: PCT/JP2021/024558
§ 371 (c)(1),
(2) Date: Feb. 9, 2023

(87) PCT Pub. No.: WO2023/275993
PCT Pub. Date: Jan. 5, 2023

(65) Prior Publication Data
US 2024/0030707 A1    Jan. 25, 2024

(51) Int. Cl.
*H02J 3/24* (2006.01)
*H02J 3/16* (2006.01)

(52) U.S. Cl.
CPC ..................... *H02J 3/16* (2013.01)

(58) Field of Classification Search
CPC ........................................................ H02J 3/16
See application file for complete search history.

(56) References Cited

U.S. PATENT DOCUMENTS

2012/0161513 A1* 6/2012 Ohshima ............. H02M 7/1626
        363/44
2014/0103727 A1* 4/2014 Taimela .................... H02J 3/28
        307/76
2018/0013288 A1* 1/2018 Yang ..................... H02J 3/1842
2022/0200475 A1* 6/2022 Uda .......................... H02M 7/49
2023/0275429 A1* 8/2023 Yachida ................... H02J 3/381
        307/69

FOREIGN PATENT DOCUMENTS

JP        2001-51734 A       2/2001
JP        2011-211803 A     10/2011

OTHER PUBLICATIONS

Written Opinion issued Sep. 21, 2021 in PCT/JP2021/024558 (with English machine translation), 7 pages.
Notice of Reasons for Refusal issued Oct. 18, 2022 in Japanese Patent Application No. 2022-504237 (with English machine translation), 4 pages.
International Search Report issued Sep. 21, 2021 in PCT/JP2021/024558 filed Jun. 29, 2021, 3 pages.

* cited by examiner

*Primary Examiner* — Jared Fureman
*Assistant Examiner* — Esayas G Yeshaw
(74) *Attorney, Agent, or Firm* — Oblon, McClelland, Maier & Neustadt, L.L.P.

(57) ABSTRACT

A power conversion device is connected to a power transmission line which is connected to a generator. The power conversion device includes a frequency detector that detects a system frequency, the system frequency being a frequency of an AC voltage on the power transmission line, a controller that generates a reactive power command value to compensate for a variation in the detected system frequency, and a power converter that outputs reactive power in accordance with the reactive power command value to the power transmission line.

2 Claims, 8 Drawing Sheets

POWER CONVERSION DEVICE

TECHNICAL FIELD

The present disclosure relates to a power conversion device.

BACKGROUND ART

When an imbalance occurs between generated power and demanded power (load-consumed power) in a power system due to various factors such as a power system fault, a rotational speed of a generator increases or decreases, causing swings in the power system. Depending on the magnitudes of the swings in the power system and the characteristics of the generator, the generator may be unable to maintain synchronous operation, causing a step-out phenomenon in which synchronization is lost.

For example, Japanese Patent Laying-Open No. 2011-211803 (PTL 1) discloses a power system stabilization device for stabilizing a power system. This power system stabilization device includes: a system voltage control unit that computes a first reactive power command value for maintaining a system voltage constant based on a measured value of the system voltage; and a power swing suppression control unit that computes a second reactive power command value for suppressing power swings based on a measured value of active power of the power system.

CITATION LIST

Patent Literature

PTL 1: Japanese Patent Laying-Open No. 2011-211803

SUMMARY OF INVENTION

Technical Problem

Unfortunately, the power system stabilization device described in PTL 1 has a current detector and a voltage detector installed on a power transmission line for measuring values of the system voltage and the active power of the power system, thus requiring many detectors to implement the system voltage control and the power swing suppression control.

In addition, since the relationship between a variation in rotational speed of a generator and the magnitude and phase of a variation in active power flow of a power system varies from power system to power system, parameters used for control in the power system stabilization device need to be adjusted depending on the applied power system.

The present disclosure has been made to solve the above-described problem, and an object of the present disclosure is to provide a power conversion device capable of suppressing a variation in rotational speed of a generator in a simple configuration.

Solution to Problem

According to an aspect of the present disclosure, there is provided a power conversion device connected to a power transmission line, the power transmission line being connected to a generator. The power conversion device includes: a frequency detector that detects a system frequency, the system frequency being a frequency of an AC voltage on the power transmission line; a controller that generates a reactive power command value to compensate for a variation in the detected system frequency; and a power converter that outputs reactive power in accordance with the reactive power command value to the power transmission line.

Advantageous Effects of Invention

According to the present disclosure, there can be provided a power conversion device capable of suppressing a variation in rotational speed of a generator in a simple configuration.

DESCRIPTION OF EMBODIMENTS

Embodiments of the present disclosure will be described in detail hereinafter with reference to the drawings. In the following description, the same or corresponding portions in the drawings are denoted by the same reference characters and description thereof will not be repeated in principle.

First Embodiment

Figure 1:
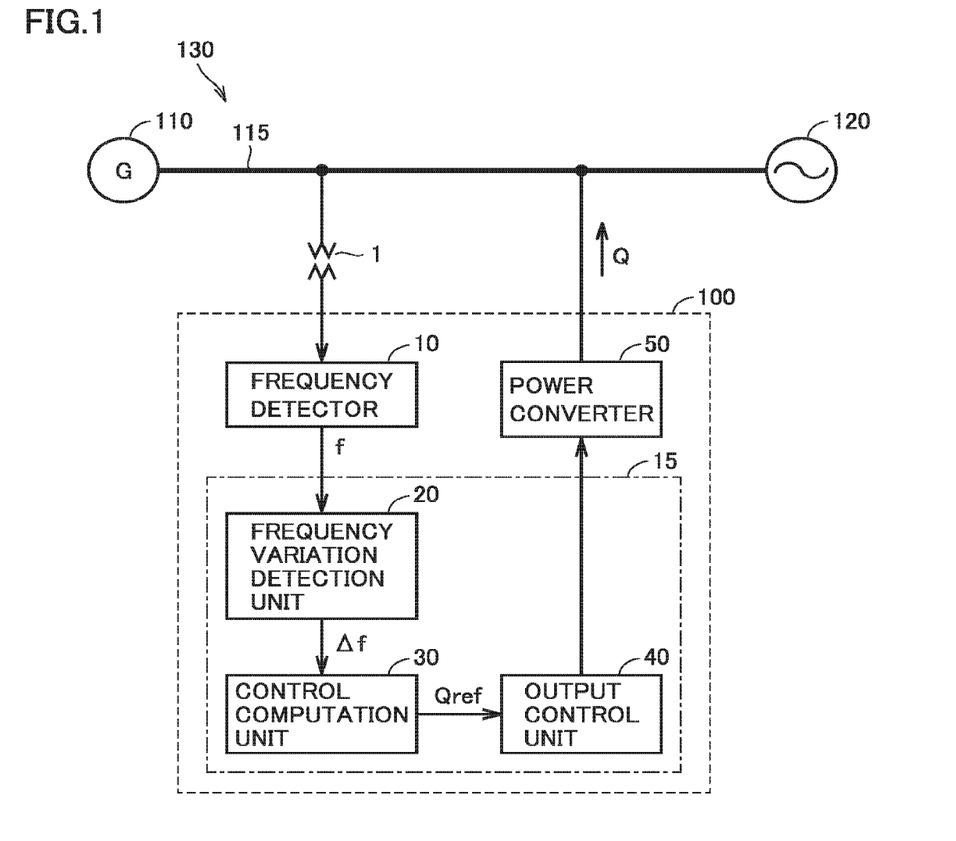
FIG. 1 shows a configuration example of a power system to which a power conversion device according to a first embodiment is applied.

FIG. 1 shows a configuration example of a power system to which a power conversion device according to a first embodiment is applied.

As shown in FIG. 1, a power conversion device 100 according to the first embodiment is connected to a power system 130 including a commercial AC power supply 120 and a power transmission line 115. Power transmission line 115 is connected to a synchronous generator (hereinafter also referred to as a generator) 110.

Generator 110 operates at a rotational speed (synchronous speed) determined by a system frequency, which is a frequency of an AC voltage on power system 130. When power system 130 is not swinging, generator 110 performs synchronous operation that maintains a constant phase difference angle depending on its output power. The phase difference angle is an angle that indicates positions of a rotor axis of generator 110 and a generated magnetic flux axis relative to each other.

When a system state suddenly changes due to the occurrence of a system fault, a load drop or the like, the rotational speed of generator 110 is accelerated or decelerated, causing a variation in the phase difference angle. This variation in the phase difference angle causes a variation in the output power from generator 110. The variation in the output power from generator 110 causes a variation in active power flow in power transmission line 115.

Depending on the magnitude of the sudden change in the system state and the characteristics of generator 110, generator 110 may be unable to maintain synchronous operation, causing a step-out phenomenon in which synchronization is lost. The step-out may trigger a series of power supply drops, causing a large-scale power failure.

In the present embodiment, to prevent the step-out of generator 110, power conversion device 100 is used to implement control of suppressing swings in power system 130. Specifically, power conversion device 100 detects a frequency variation amount indicating a variation in the system frequency, and performs control of suppressing swings in power system 130 by using the detected frequency variation amount as an input parameter.

As shown in FIG. 1, power conversion device 100 includes a frequency detector 10, a power converter 50, and a controller 15.

A voltage detector 1 detects an instantaneous value of an AC voltage on power transmission line 115, and outputs a signal indicating the detected value to frequency detector 10.

Frequency detector 10 detects, based on the output signal from voltage detector 1, a system frequency f from a waveform of the AC voltage on power transmission line 115, which is a frequency of this voltage. Frequency detector 10 detects system frequency f using, for example, a well-known phase locked loop (PLL) circuit. Frequency detector 10 outputs a signal indicating the detected value of system frequency f to controller 15.

Power converter 50 can typically be formed by a static synchronous compensator (STATCOM). Power converter 50 has a plurality of reactors, a plurality of capacitors and a plurality of switching devices. Power converter 50 is controlled by controller 15 and outputs reactive power Q to power transmission line 115. Power converter 50 can selectively output leading reactive power or lagging reactive power by turning on and off each of the plurality of switching devices, and can control the magnitudes of the reactive powers to have desired values. However, any device can be applied, including self-excited and separately-excited reactive power regulators, as long as it can output controlled reactive power.

Controller 15 controls, using system frequency f, reactive power Q which is output to power transmission line 115 by power converter 50. Specifically, controller 15 includes a frequency variation detection unit 20, a control computation unit 30, and an output control unit 40.

Frequency variation detection unit 20 calculates, using system frequency f detected by frequency detector 10, a frequency variation amount Δf indicating a variation (increase or decrease) in system frequency f. Control computation unit 30 calculates a reactive power command value Qref in accordance with a predetermined control computation using frequency variation amount Δf as an input parameter. Output control unit 40 generates a control command for power converter 50 for outputting reactive power Q in accordance with reactive power command value Qref. The control command is input to power converter 50.

Figure 2:
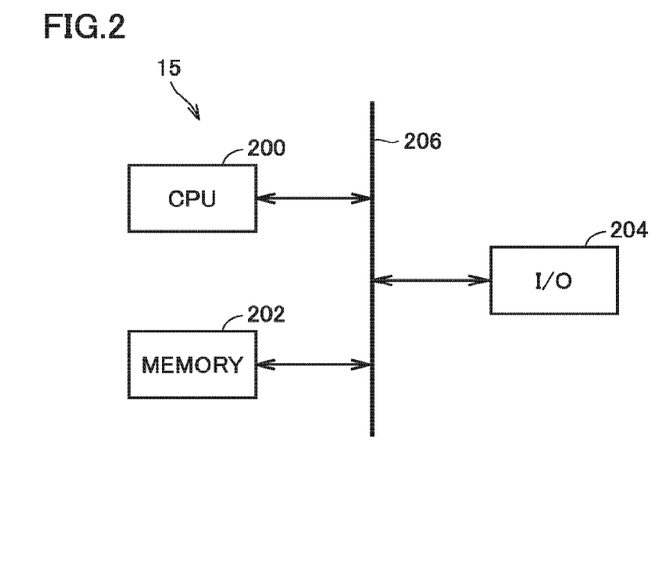
FIG. 2 is a block diagram showing a hardware configuration example of a controller.

FIG. 2 is a block diagram showing a hardware configuration example of controller 15. Typically, controller 15 can be formed by a microcomputer on which a predetermined program is prestored.

In the example of FIG. 2, controller 15 includes a central processing unit (CPU) 200, a memory 202 and an input/output (I/O) circuit 204. CPU 200, memory 202 and I/O circuit 204 can mutually receive and transmit data via a bus 206. A program is stored in a partial area of memory 202, and when CPU 200 executes the program, various functions described below can be implemented. I/O circuit 204 inputs and outputs signals and data to and from the outside of controller 15.

Alternatively, unlike the example of FIG. 2, at least a part of controller 15 can be formed by using a circuit such as a field programmable gate array (FPGA) or an application specific integrated circuit (ASIC). At least a part of controller 15 can also be formed by an analog circuit.

In this manner, the functions of the respective blocks of frequency variation detection unit 20, control computation unit 30 and output control unit 40 shown in FIG. 1 can be implemented by at least one of software processing and hardware processing by controller 15.

Figure 3:
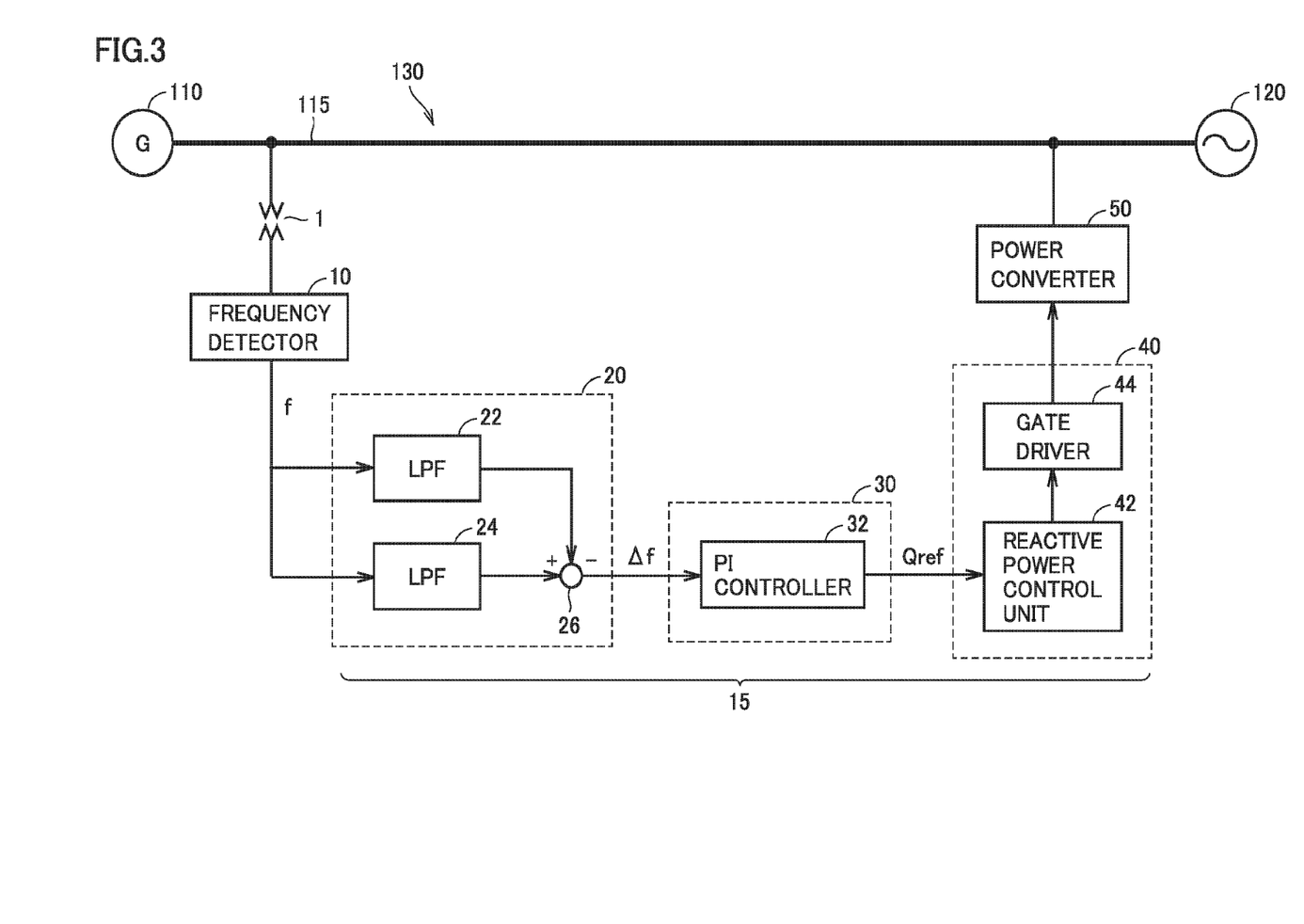
FIG. 3 is a block diagram showing a configuration example of the controller.

FIG. 3 is a block diagram showing a configuration example of controller 15.

As shown in FIG. 3, system frequencies f detected by frequency detector 10 are sequentially input to frequency variation detection unit 20. Frequency variation detection unit 20 includes low pass filters (LPFs) 22, 24 and a subtractor 26.

LPF 22 and LPF 24 have different time constants. LPF 22 has a larger time constant than LPF 24. LPF 22 extracts, from system frequency f detected by frequency detector 10, a frequency component including a reference value (hereinafter also referred to as a reference frequency) fref of the system frequency. LPF 24 extracts, from system frequency f detected by frequency detector 10, a frequency component which is higher than reference frequency fref and includes a prescribed difference from reference frequency fref.

Subtractor 26 subtracts the frequency component which is output from LPF 22 from the frequency component which is output from LPF 24, to thereby calculate frequency variation amount Δf.

Alternatively, frequency variation amount Δf can be calculated as a difference between reference frequency fref (for example, a set value corresponding to 50 [Hz] or 60 [Hz] that is a nominal value) and current system frequency f (Δf=f−fref).

In this manner, in the present embodiment, frequency variation amount Δf is calculated such that, when system frequency f increases, frequency variation amount Δf has a positive polarity (Δf>0), and when system frequency f decreases, frequency variation amount Δf has a negative polarity (Δf<0). A method for calculating frequency variation amount Δf is not limited to the example described above. Frequency variation amount Δf can be calculated by any method including a change of the definition of polarity (positive/negative), as long as it can represent the increase and decrease in system frequency.

Control computation unit 30 calculates reactive power command value Qref to compensate for frequency variation amount Δf that has been input thereto. Specifically, control computation unit 30 includes a proportional integral (PI) controller 32. PI controller 32 adds a value proportional to frequency variation amount Δf and a value proportional to an integral value of frequency variation amount Δf, to thereby generate reactive power command value Qref.

Output control unit 40 includes a reactive power control unit 42 and a gate driver 44. Reactive power control unit 42 controls reactive power which is output from power converter 50 in accordance with reactive power command value Qref. Reactive power control unit 42 generates, based on reactive power command value Qref, control commands for controlling ON and OFF of the plurality of switching devices included in power converter 50. Gate driver 44 controls, in accordance with the generated control commands, ON and OFF of the plurality of switching devices included in the power converter.

Next, an operation of power conversion device 100 according to the first embodiment will be described.

When the system state suddenly changes due to the occurrence of a system fault, a load drop or the like in power system 130, the rotational speed of generator 110 increases or decreases, and this variation in the rotational speed causes a variation in system frequency f.

In power conversion device 100, controller 15 calculates frequency change amount Δf using the output signal from frequency detector 10, and calculates reactive power command value Qref through a control computation using calculated frequency change amount Δf as an input parameter. Controller 15 controls power converter 50 in accordance with calculated reactive power command value Qref. Power converter 50 outputs reactive power Q in accordance with reactive power command value Qref to power transmission line 115.

By outputting reactive power Q to compensate for the variation in system frequency f to power system 130 in this manner, the variation in the rotational speed of generator 110 is suppressed, and swings in power system 130 are thereby suppressed. As a result, the occurrence of the step-out phenomenon of generator 110 can be prevented.

Figure 4:
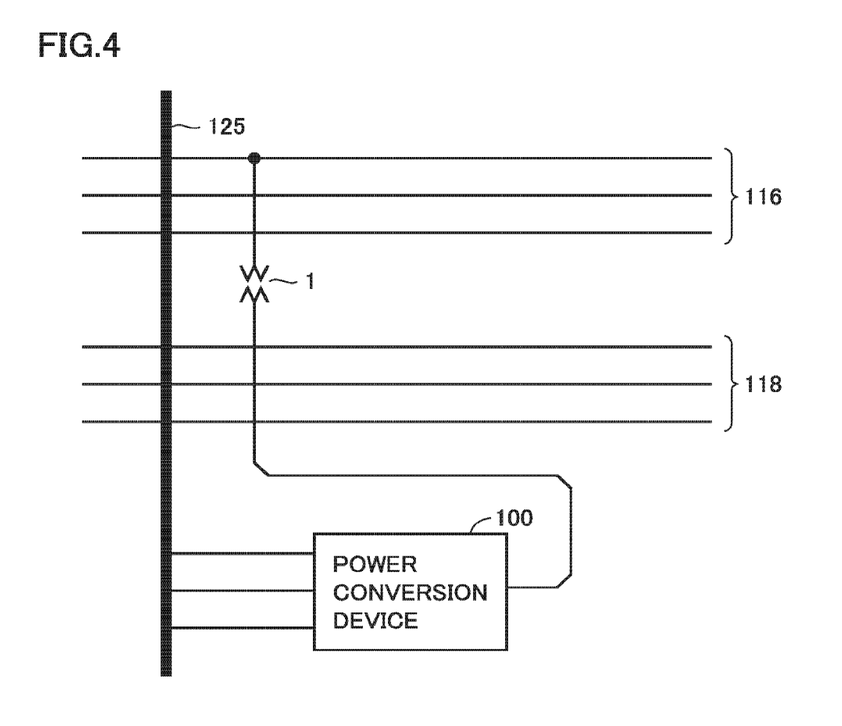
FIG. 4 shows an implementation of the power conversion device according to the first embodiment.

FIG. 4 shows an implementation of power conversion device 100 according to the first embodiment. FIG. 4 shows an implementation of power conversion device 100 when power transmission line 115 has two three-phase lines.

Power transmission line 115 has a first line 116 and a second line 118. Each of first line 116 and second line 118 is connected to a substation bus 125, and transports power as a three-phase AC current using three-phase power transmission lines as one line.

Voltage detector 1 is connected to one of three power transmission lines forming first line 116. Voltage detector 1 detects an instantaneous value of an AC voltage on this one power transmission line, and outputs a signal indicating the detected value to power conversion device 100.

Power conversion device 100 detects system frequency f using the output signal from voltage detector 1, and outputs reactive power to compensate for a variation in system frequency f to substation bus 125.

System frequency f is equal between first line 116 and second line 118. System frequency f is also equal among the three power transmission lines forming each line. As shown in FIG. 4, therefore, voltage detector 1 for detecting system frequency f is only required to be connected to one power transmission line included in one of the lines, and thus only one voltage detector is needed.

Comparative Example

To clarify the effects of the first embodiment, a configuration and an operation of a power conversion device according to a comparative example of the first embodiment will be described.

Figure 5:
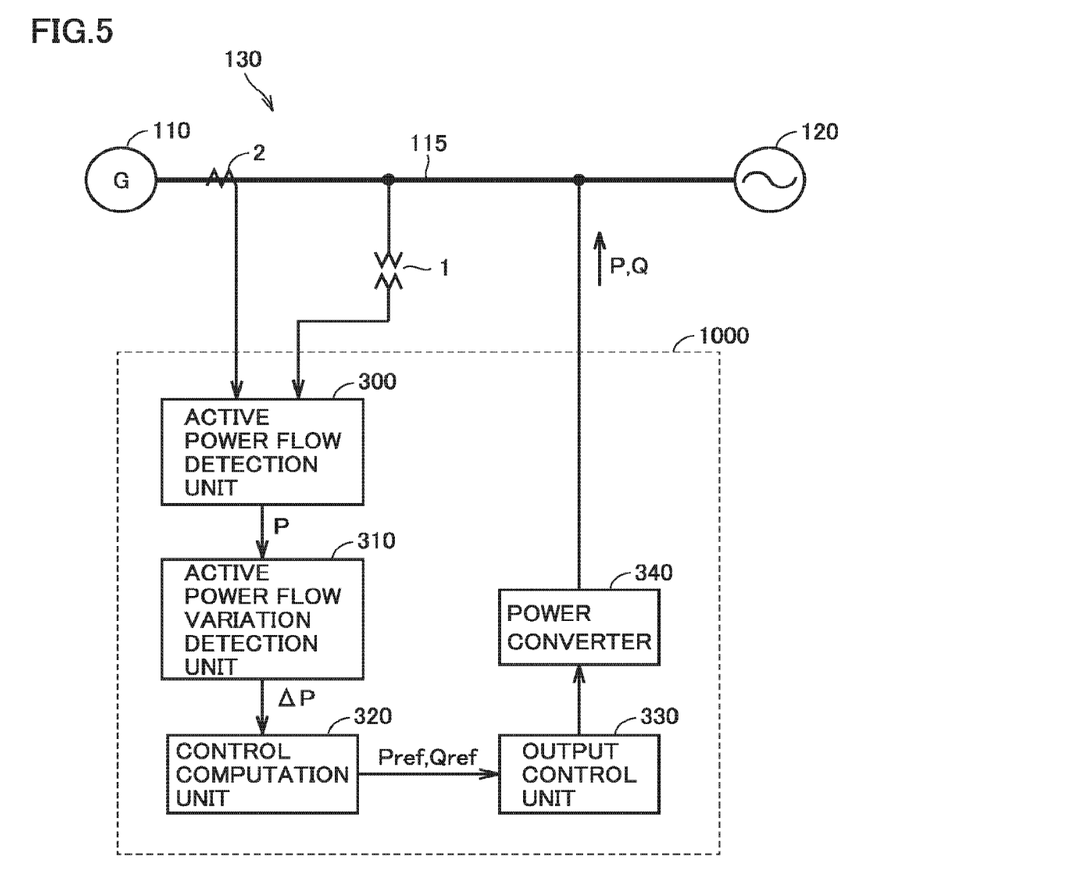
FIG. 5 shows a configuration example of a power system to which a power conversion device according to a comparative example is applied.

FIG. 5 shows a configuration example of a power system to which the power conversion device according to the comparative example is applied.

As shown in FIG. 5, a power conversion device 1000 according to the comparative example includes an active power flow detection unit 300, an active power flow variation detection unit 310, a control computation unit 320, an output control unit 330, and a power converter 340.

Voltage detector 1 detects an instantaneous value of the AC voltage on power transmission line 115, and outputs a signal indicating the detected value to active power flow detection unit 300. A current detector 2 detects an AC current flowing through power transmission line 115, and outputs a signal indicating the detected value to active power flow detection unit 300.

Active power flow detection unit 300 detects, using the output signals from voltage detector 1 and current detector 2, an active power flow P flowing through power transmission line 115.

Active power flow variation detection unit 310 calculates, using active power flow P detected by active power flow detection unit 300, an active power flow variation amount ΔP indicating a variation (increase or decrease) in active power flow P. Specifically, active power flow variation detection unit 310 subtracts a reference value of the active power flow from current active power flow P, to thereby calculate active power flow variation amount ΔP. The reference value of the active power flow is determined, such as through a flow calculation performed to develop an operation plan of power system 130.

Control computation unit 320 calculates an active power command value Pref and/or reactive power command value Qref in accordance with a predetermined control computation using active power flow variation amount ΔP as an input.

Output control unit 330 generates a control command for power converter 340 for outputting active power P in accordance with active power command value Pref and/or reactive power Q in accordance with reactive power command value Qref. The control command is input to power converter 340.

As described above, when the system state suddenly changes, the rotational speed of generator 110 varies, causing a variation in the output power from generator 110. The variation in the output power from generator 110 causes a variation in the active power flow in power transmission line 115. Power conversion device 1000 according to the comparative example is configured to detect an active power flow variation amount indicating this variation in the active power flow, and to perform control of suppressing swings in power system 130 by using the detected active power flow variation amount as an input parameter.

That is, power conversion device 1000 according to the comparative example is configured to compensate for not the rotational speed itself of generator 110 to be controlled, but the variation in the active power flow, which is a phenomenon resulting from a variation in the rotational speed of generator 110. Accordingly, it can be said that power conversion device 1000 according to the comparative example indirectly controls the rotational speed of generator 110.

The relationship (such as a transfer function) between the variation in the rotational speed of generator 110 and the variation in the active power flow on power transmission line 115 varies from power system to power system. In power conversion device 1000 according to the comparative example, therefore, parameters such as a gain and a time constant in the control computation need to be adjusted depending on the above-described relationship (such as a transfer function) for each power system to be applied.

In contrast, power conversion device 100 according to the first embodiment is configured to detect a variation in the system frequency having a one-to-one relationship with the rotational speed of generator 110, and to compensate for the variation in the system frequency. Thus, the rotational speed of generator 110 to be controlled can be known, and therefore, power conversion device 100 according to the first embodiment can directly control the rotational speed of generator 110. Thus, unlike power conversion device 1000 according to the comparative example, the parameters do not need to be adjusted depending on the above-described relationship (such as a transfer function) for each power system to be applied.

Figure 6:
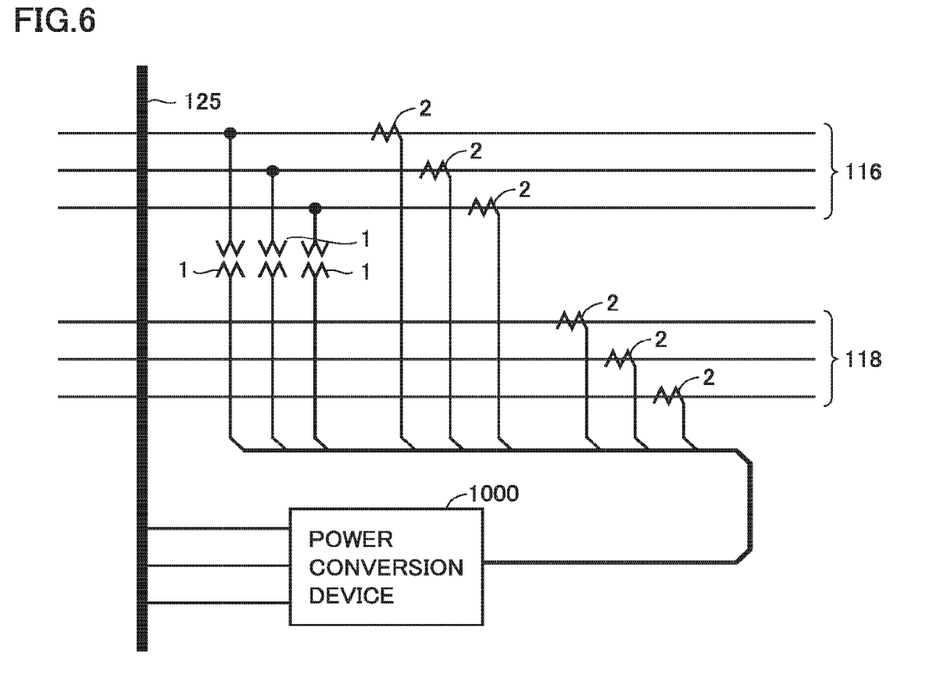
FIG. 6 shows an implementation of the power conversion device according to the comparative example.

FIG. 6 shows an implementation of power conversion device 1000 according to the comparative example, which is illustrated as compared with FIG. 4. FIG. 6 shows an implementation of power conversion device 1000 when power transmission line 115 has two three-phase lines. Similarly to FIG. 4, power transmission line 115 has substation bus 125, and first line 116 and second line 118 connected to substation bus 125.

Three voltage detectors 1 are connected to three power transmission lines forming first line 116, respectively. Each of three voltage detectors 1 detects an instantaneous value of a voltage of the corresponding phase of the three-phase AC voltages, and outputs a signal indicating the detected value to power conversion device 1000 (active power flow detection unit 300).

Three current detectors 2 are connected to the three power transmission lines forming first line 116, respectively. Each of three current detectors 2 detects an AC current flowing through a power transmission line of the corresponding phase, and outputs a signal indicating the detected value to power conversion device 1000 (active power flow detection unit 300).

Three current detectors 2 are connected to three power transmission lines forming second line 118, respectively. Each of three current detectors 2 detects an AC current flowing through a power transmission line of the corresponding phase, and outputs a signal indicating the detected value to power conversion device 1000 (active power flow detection unit 300).

When the system state varies, the three-phase AC voltages on power transmission line 115 may become imbalanced, causing the voltages of the respective phases to have different magnitudes. In order to calculate the active power flow of each phase, therefore, voltage detector 1 needs to be provided for each phase. In addition, in order to calculate the active power flow of each phase, current detector 2 needs to be provided for each phase in each line. As a result, when power transmission line 115 has two three-phase lines, a total of nine detectors are needed to detect the active power flows.

In contrast, in the first embodiment, only one voltage detector 1 is needed as shown in FIG. 4, where the detector for detecting the system frequency having a one-to-one relationship with the rotational speed of generator 110 is connected to one power transmission line included in one of the lines. Therefore, the number of detectors needed to control the rotational speed of generator 110 can be reduced.

Second Embodiment

Figure 7:
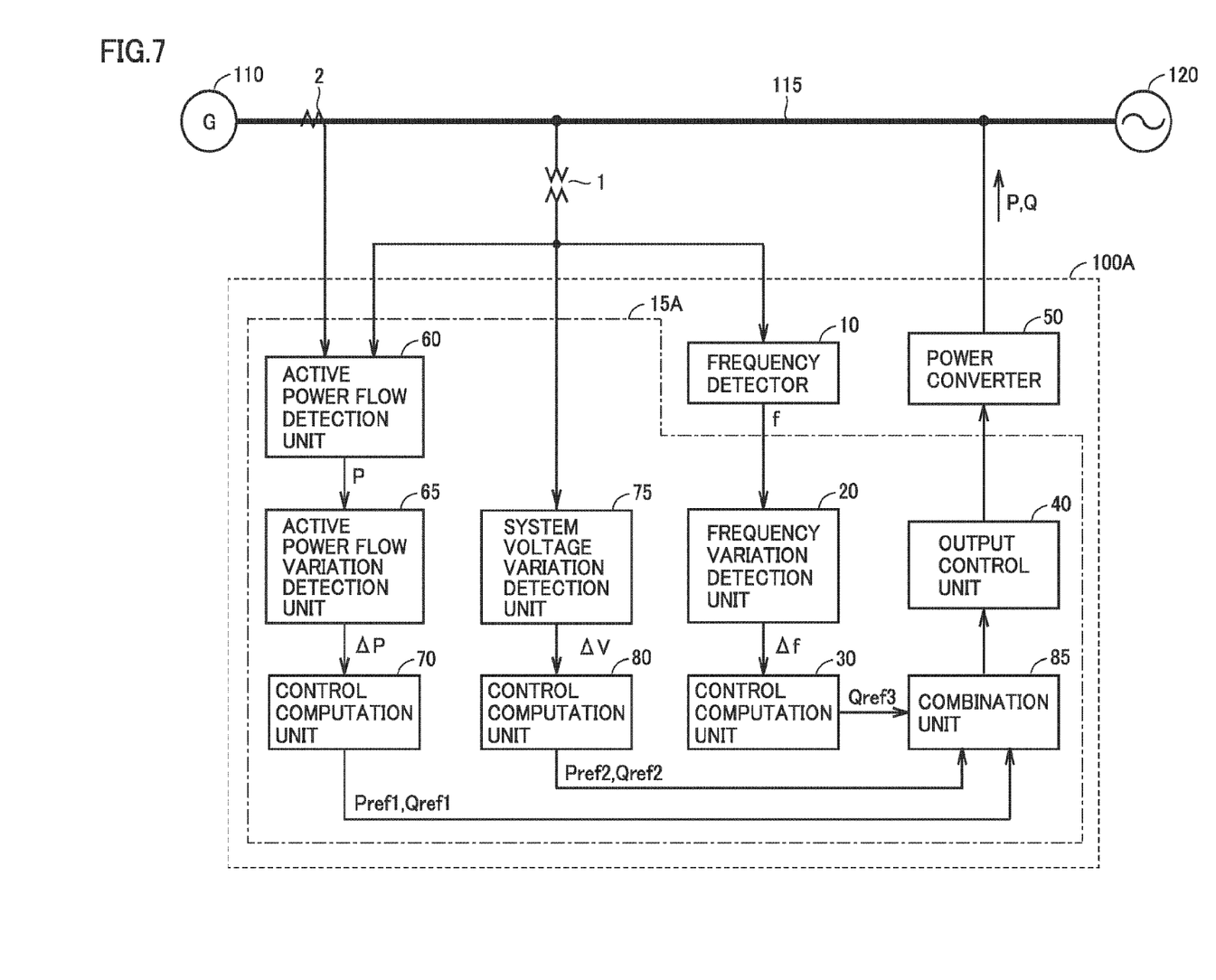
FIG. 7 shows a configuration of a power conversion device according to a second embodiment.

FIG. 7 shows a configuration of a power conversion device according to a second embodiment.

As shown in FIG. 7, a power conversion device 100A according to the second embodiment is different from power conversion device 100 according to the first embodiment in that controller 15 has been replaced by a controller 15A.

Controller 15A has, in addition to the above-described system frequency variation suppression means for suppressing a variation in the system frequency, system voltage control means for maintaining the AC voltage on power transmission line 115 (system voltage) constant, and active power flow variation suppression means for suppressing a variation in the active power flow.

Specifically, controller 15A includes an active power flow detection unit 60, an active power flow variation detection unit 65, a system voltage variation detection unit 75, frequency variation detection unit 20, control computation units 30, 70, 80, a combination unit 85, and output control unit 40.

Voltage detector 1 detects an instantaneous value of the AC voltage on power transmission line 115, and outputs a signal indicating the detected value to frequency detector 10, active power flow detection unit 60 and system voltage variation detection unit 75.

Current detector 2 detects the AC current flowing through power transmission line 115, and outputs a signal indicating the detected value to active power flow detection unit 60.

Active power flow detection unit 60 detects, using the output signal from voltage detector 1 and the output signal from current detector 2, active power flow P flowing through power transmission line 115.

Active power flow variation detection unit 65 calculates, using active power flow P detected by active power flow detection unit 60, active power flow variation amount $\Delta P$ indicating a variation (increase or decrease) in active power flow P. Specifically, active power flow variation detection unit 65 subtracts a reference value Pc of the active power flow (reference active power flow) from current active power flow P, to thereby calculate active power flow variation amount $\Delta P$ ($\Delta P = Pc - P$). Reference value Pc of the active power flow is determined, such as through a flow calculation performed to develop an operation plan of power system 130.

Control computation unit 70 generates an active power command value Pref1 and/or a reactive power command value Qref1 in accordance with a predetermined control computation using active power flow variation amount $\Delta P$ as an input. Specifically, control computation unit 70 calculates, using the relationship (such as a transfer function) between the variation in the rotational speed of generator 110 and the variation in the active power flow on power transmission line 115, a rotational speed variation amount indicating a variation in the rotational speed of generator 110 from active power flow variation amount $\Delta P$. Then, control computation unit 70 adds a value proportional to the calculated rotational speed variation amount and a value proportional to an integral value of the rotational speed variation amount, to thereby generate active power command value Pref1 and/or reactive power command value Qref1. Active power command value Pref1 corresponds to an example of "first active power command value," and reactive power command value Qref1 corresponds to an example of "first reactive power command value." Active power flow detection unit 60, active power flow variation detection unit 65 and control computation unit 70 implement the "active power flow variation suppression means" for suppressing a variation in the active power flow.

System voltage variation detection unit 75 calculates, using the system voltage detected by voltage detector 1, a system voltage variation amount $\Delta V$ indicating a variation (increase or decrease) in a system voltage V. Specifically, system voltage variation detection unit 75 determines an effective value Ve of current system voltage V. System voltage variation detection unit 75 subtracts a reference value Vc (reference voltage value) of the effective value of the system voltage determined through a flow calculation or the like from effective value Ve of current system voltage V, to thereby calculate system voltage variation amount ΔV (ΔV=Ve−Vc).

Control computation unit 80 generates an active power command value Pref2 and/or a reactive power command value Qref2 in accordance with a predetermined control computation using system voltage variation amount ΔV as an input. For example, control computation unit 80 adds a value proportional to system voltage variation amount ΔV and a value proportional to an integral value of system voltage variation amount ΔV, to thereby generate active power command value Pref2 and/or reactive power command value Qref2. Active power command value Pref2 corresponds to an example of "second active power command value," and reactive power command value Qref2 corresponds to an example of "second reactive power command value." System voltage variation detection unit 75 and control computation unit 80 implement the "system voltage control means" for maintaining the system voltage constant.

Frequency variation detection unit 20 calculates frequency variation amount Δf, using system frequency f detected by frequency detector 10. Control computation unit 30 generates a reactive power command value Qref3 in accordance with a predetermined control computation using frequency variation amount Δf as an input. Reactive power command value Qref3 corresponds to an example of "third reactive power command value." Frequency detector 10, frequency variation detection unit 20 and control computation unit 30 implement the "system frequency variation suppression means" for suppressing a variation in the system frequency.

Combination unit 85 combines active power command value Pref1 and reactive power command value Qref1 generated by control computation unit 70, active power command value Pref2 and reactive power command value Qref2 generated by control computation unit 80, and reactive power command value Qref3 generated by control computation unit 30, to generate active power command value Pref and reactive power command value Qref.

Output control unit 40 generates control commands for power converter 50 for outputting active power P and reactive power Q in accordance with active power command value Pref and reactive power command value Qref, respectively. The control commands are input to power converter 50.

Figure 8:
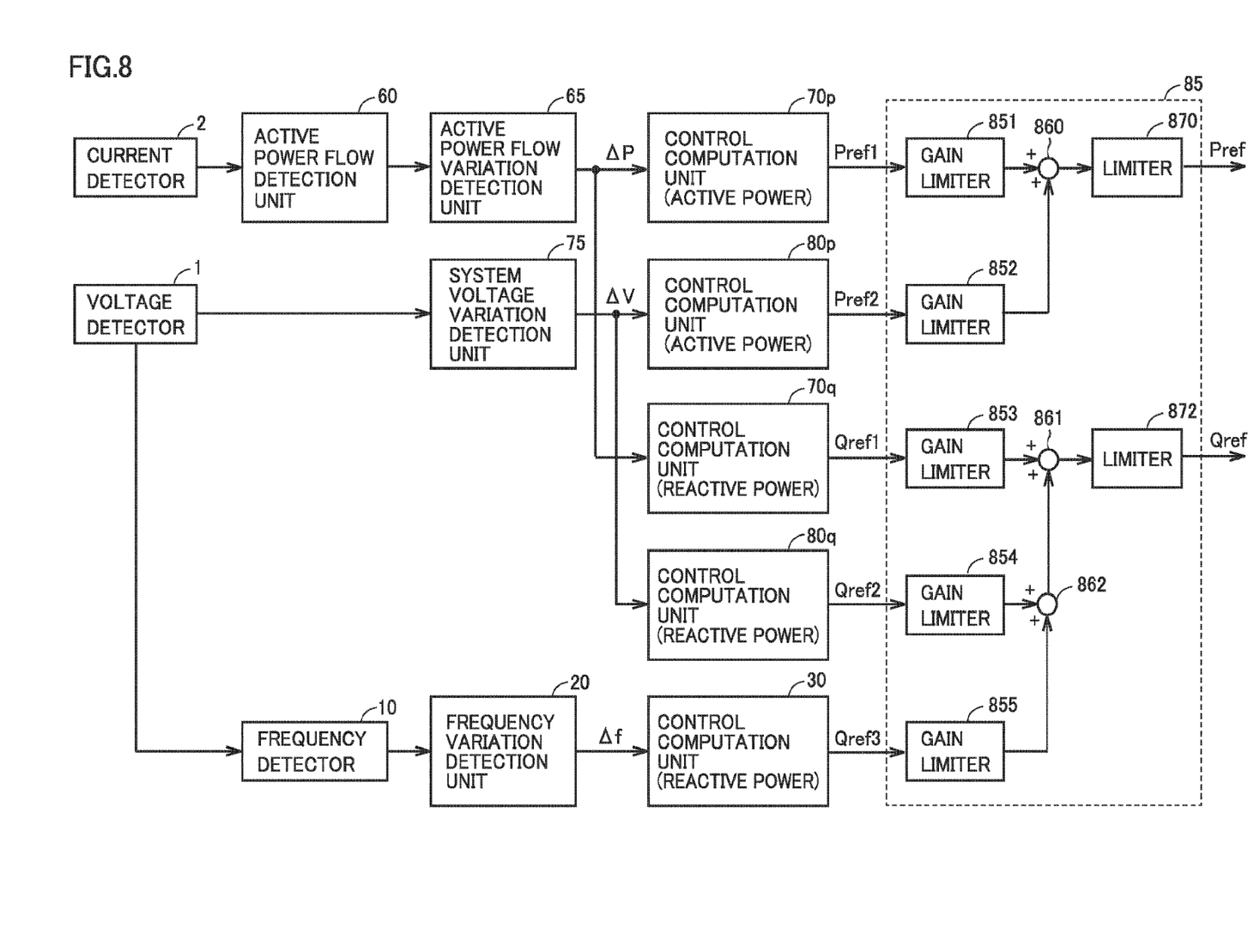
FIG. 8 is a block diagram showing a configuration example of a combination unit shown in FIG. 7.

FIG. 8 is a block diagram showing a configuration example of combination unit 85 shown in FIG. 7.

As shown in FIG. 8, control computation unit 70 has a control computation unit 70*p* that generates active power command value Pref1 to compensate for active power flow variation amount ΔP, and a control computation unit 70*q* that generates reactive power command value Qref1 to compensate for active power flow variation amount ΔP.

Control computation unit 80 has a control computation unit 80*p* that generates active power command value Pref2 to compensate for system voltage variation amount ΔV, and a control computation unit 80*q* that generates reactive power command value Qref2 to compensate for system voltage variation amount ΔV.

Combination unit 85 includes gain limiters 851 to 855, adders 860 to 862, and limiters 870, 872.

Gain limiter 851 multiplies active power command value Pref1 by a gain K1 (first gain), and outputs a multiplied value K1·Pref1. Gain limiter 851 performs a limiter process on multiplied value K1·Pref1.

Gain limiter 852 multiplies active power command value Pref2 by a gain K2 (second gain), and outputs a multiplied value K2·Pref2. Gain limiter 852 performs a limiter process on multiplied value K2·Pref2.

Adder 860 adds active power command value K1·Pref1 which is input from gain limiter 851 and active power command value K2·Pref2 which is input from gain limiter 852, to thereby generate active power command value Pref (Pref=K1·Pref1+K2·Pref2). Active power command value Pref corresponds to an example of "fourth active power command value."

Limiter 870 performs a limiter process on active power command value Pref to keep this command value within an output range of power converter 50.

Gain limiter 853 multiplies reactive power command value Qref1 by a gain K3 (third gain), and outputs a multiplied value K3·Qref1. Gain limiter 853 performs a limiter process on multiplied value K3·Qref1.

Gain limiter 854 multiplies reactive power command value Qref2 by a gain K4 (fourth gain), and outputs a multiplied value K4·Qref2. Gain limiter 854 performs a limiter process on multiplied value K4·Qref2.

Gain limiter 855 multiplies reactive power command value Qref3 by a gain K5 (fifth gain), and outputs a multiplied value K5·Qref3. Gain limiter 855 performs a limiter process on multiplied value K5·Qref3.

Adder 862 adds reactive power command value K4·Qref2 which is input from gain limiter 854, and reactive power command value K5·Qref3 which is input from gain limiter 855. Adder 861 adds reactive power command value K3·Qref1 which is input from gain limiter 853, and the added value of reactive power command value K4·Qref2 and reactive power command value K5·Qref3 which is input from adder 862, to thereby generate reactive power command value Qref (Qref=K3·Qref1+K4·Qref2+K5·Qref3). Reactive power command value Qref corresponds to an example of "fourth reactive power command value."

Limiter 872 performs a limiter process on reactive power command value Qref to keep this command value within the output range of power converter 50.

In the configuration described above, gains K1 to K5 that are set for gain limiters 851 to 855, respectively, are set based on an order of priority of the active power flow variation suppression means, the system voltage control means, and the system frequency variation suppression means. The order of priority can be changed as appropriate depending on the system state. For example, if the system frequency variation suppression function is to be prioritized over the active power flow suppression function and the system voltage control function, gain K5 can be set to a higher value than gains K1 to K4.

As described above, according to power conversion device 100A in the second embodiment, the active power flow variation suppression means, the system voltage control means and the system frequency variation suppression means can be combined, to thereby increase the flexibility of the control of suppressing swings in the power system. As a result, swings in the power system can be suppressed by appropriate control depending on the applied power system.

However, if power conversion device 100A according to the second embodiment is mounted on power transmission line 115 having two three-phase lines, a total of nine detectors are needed for detecting the three-phase AC voltages on power transmission line 115 and the three-phase AC currents flowing through power transmission line 115, as in the comparative example (see FIG. 6).

It should be understood that the embodiments disclosed herein are illustrative and non-restrictive in every respect. The present invention is defined by the terms of the claims, rather than the description above, and is intended to include any modifications within the scope and meaning equivalent to the terms of the claims.

REFERENCE SIGNS LIST 1 voltage detector; 2 current detector; 10 frequency detector; 15, 15A controller; 20 frequency variation detection unit; 22, 24 LPF; 26 subtractor; 30, 70, 80, 70$p$, 70$q$, 80$p$, 80$q$ control computation unit; 32 PI controller; 40 output control unit; 42 reactive power control unit; 44 gate driver; 50 power converter; 60, 300 active power flow detection unit; 65, 310 active power flow variation detection unit; 75 system voltage variation detection unit; 85 combination unit; 100, 100A, 1000 power conversion device; 115 power transmission line; 116 first line; 118 second line; 125 substation bus; 130 power system; 200 CPU; 202 memory; 204 I/O circuit; 851 to 855 gain limiter; 860 to 862 adder; 870, 872 limiter.

The invention claimed is:

1. A power conversion device connected to a power transmission line, the power transmission line being connected to a generator, the power conversion device comprising:
   a frequency detector that detects a system frequency, the system frequency being a frequency of an AC voltage on the power transmission line;
   a controller that generates a reactive power command value to compensate for a variation in the detected system frequency; and
   a power converter that outputs reactive power in accordance with the reactive power command value to the power transmission line,
   wherein
   the controller includes
      an active power flow detection circuit that detects an active power flow in the power transmission line,
      an active power flow variation detection circuit that calculates an amount of variation in the active power flow,
      a first control computation circuit that calculates a first active power command value and a first reactive power command value in accordance with a predetermined control computation using the amount of variation in the active power flow as an input,
      a system voltage variation detection circuit that calculates an amount of variation in an effective value of a system voltage on the power transmission line,
      a second control computation circuit that calculates a second active power command value and a second reactive power command value in accordance with a predetermined control computation using the amount of variation in the system voltage as an input,
      a frequency variation detection circuit that calculates an amount of variation in the system frequency,
      a third control computation circuit that calculates a third reactive power command value in accordance with a predetermined control computation using the amount of variation in the system frequency as an input,
      a combination circuit that combines the first and second active power command values calculated by the first to third control computation circuits to generate a fourth active power command value, and combines the first to third reactive power command values to generate a fourth reactive power command value, and
      an output control circuit that controls the power converter to output active power in accordance with the fourth active power command value and reactive power in accordance with the fourth reactive power command value.

2. The power conversion device according to claim 1, wherein
   the combination circuit
      adds a product of the first active power command value and a first gain and a product of the second active power command value and a second gain, to thereby generate the fourth active power command value, and
      adds a product of the first reactive power command value and a third gain, a product of the second reactive power command value and a fourth gain, and a product of the third reactive power command value and a fifth gain, to thereby generate the fourth reactive power command value.

* * * * *